United States Patent
Kim (10) Patent No.: US 11,845,252 B2
(45) Date of Patent: Dec. 19, 2023

(54) FLEXIBLE DISPLAY DEVICE AND METHOD OF PROVIDING THE SAME

(71) Applicant: Samsung Display Co., LTD., Yongin-si (KR)

(72) Inventor: Hwanjin Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 5 days.

(21) Appl. No.: 17/347,840

(22) Filed: Jun. 15, 2021

(65) Prior Publication Data

US 2022/0088911 A1   Mar. 24, 2022

(30) Foreign Application Priority Data

Sep. 22, 2020   (KR) .......................... 10-2020-0122043

(51) Int. Cl.
    B32B 37/12    (2006.01)
    B32B 17/10    (2006.01)
    G06F 1/16     (2006.01)

(52) U.S. Cl.
    CPC .............. *B32B 37/12* (2013.01); *B32B 17/10* (2013.01); *G06F 1/1652* (2013.01); *B32B 2457/20* (2013.01)

(58) Field of Classification Search
    None
    See application file for complete search history.

(56) References Cited

U.S. PATENT DOCUMENTS

| | | | |
|---|---|---|---|
| 10,268,242 B2 * | 4/2019 | Seo .................... | G02F 1/133308 |
| 2015/0007669 A1 * | 1/2015 | Jeong ..................... | G01N 3/20 |
| | | | 73/849 |
| 2015/0086740 A1 * | 3/2015 | Shin .......................... | C09J 7/30 |
| | | | 156/275.3 |
| 2015/0266272 A1 * | 9/2015 | Lee ......................... | B32B 17/10 |
| | | | 156/60 |
| 2015/0268697 A1 * | 9/2015 | Nam ..................... | G06F 1/1643 |
| | | | 428/157 |
| 2017/0121564 A1 * | 5/2017 | Cho ...................... | C08F 265/06 |
| 2018/0364759 A1 * | 12/2018 | Ahn ..................... | G06F 1/1652 |
| 2019/0014669 A1 * | 1/2019 | Ahn ..................... | H04M 1/0268 |

(Continued)

FOREIGN PATENT DOCUMENTS

| KR | 1020150078001 A | 7/2015 |
|---|---|---|
| KR | 1020170064160 A | 6/2017 |
| KR | 10-1862251 B1 | 5/2018 |

OTHER PUBLICATIONS

KR20170064160A_machine_translation (Year: 2017).*

*Primary Examiner* — Francisco W Tschen
*Assistant Examiner* — Abhishek A Patwardhan
(74) *Attorney, Agent, or Firm* — CANTOR COLBURN LLP (57) ABSTRACT

A flexible display device includes a display panel including a bendable area and a non-bendable area which is adjacent to the bendable area in a direction, a window facing the display panel, and an adhesive layer between the display panel and the window. The adhesive layer includes a bendable portion corresponding to the bendable area and having a thickness which varies along the direction to define a wrinkled shape of the bendable portion, and a non-bendable portion corresponding to the non-bendable area and having a thickness which is constant along the direction.

20 Claims, 8 Drawing Sheets

(56) References Cited

U.S. PATENT DOCUMENTS

| | | | |
|---|---|---|---|
| 2019/0173030 A1* | 6/2019 | Kim | H01L 27/3244 |
| 2020/0251679 A1* | 8/2020 | Ha | H01L 27/323 |
| 2020/0274104 A1* | 8/2020 | Park | H01L 51/5246 |

* cited by examiner

FLEXIBLE DISPLAY DEVICE AND METHOD OF PROVIDING THE SAME

This application claims priority to Korean Patent Application No. 10-2020-0122043 filed on Sep. 22, 2020, and all the benefits accruing therefrom under 35 U.S.C. § 119, the entire disclosure of which is incorporated by reference herein.

BACKGROUND

1. Field

Embodiments relate to a display device. More particularly, embodiments relate to a flexible display device that is bendable and a method of providing the flexible display device.

2. Description of the Related Art

A flexible display device that can be deformed into various shapes has been developed. Unlike a flat panel display, the flexible display device may be foldable, bendable or rollable like paper. The flexible display device is easy to carry and may improve user convenience.

The flexible display device may include a display panel displaying an image and a window which is disposed on the display panel to protect the display panel. The image displayed by the display panel may be provided to outside the display device through the window.

SUMMARY

Embodiments provide a flexible display device in which wrinkles are not visually recognized and a method of providing the flexible display device.

One or more embodiment of a flexible display device includes a display panel including a bendable area and a non-bendable area which is adjacent to the bendable area in a direction, a window on the display panel, and an adhesive layer between the display panel and the window. The adhesive layer includes a bendable portion overlapping the bendable area and a non-bendable portion overlapping the non-bendable area. A thickness of the bendable portion varies along the direction. A thickness of the non-bendable portion is constant along the direction.

In an embodiment, the bendable portion may have a maximum thickness between a bending axis and a point which is spaced apart from the bending axis by $1/4*\pi*R$ in the direction, where the R is a radius of curvature of the bendable area of the display panel.

In an embodiment, the maximum thickness of the bendable portion may be greater than the thickness of the non-bendable portion.

In an embodiment, a value obtained by subtracting the thickness of the non-bendable portion from the maximum thickness of the bendable portion may be about 5 micrometers ($\mu m$) to about 40 $\mu m$.

In an embodiment, the bendable portion may have the maximum thickness at the bending axis.

In an embodiment, the bendable portion may have a minimum thickness between a point spaced apart from a bending axis by $1/4*\pi*R$ in the direction and a point spaced apart from the bending axis by $3/4*\pi*R$ in the direction, where the R is a radius of curvature of the bendable area of the display panel.

In an embodiment, the minimum thickness of the bendable portion may be less than the thickness of the non-bendable portion.

In an embodiment, a value obtained by subtracting the minimum thickness of the bendable portion from the thickness of the non-bendable portion may be about 5 $\mu m$ to about 40 $\mu m$.

In an embodiment, the bendable portion may have the minimum thickness at a point spaced apart from the bending axis by $2/4*\pi*R$ in the direction.

In an embodiment, the adhesive layer may include a first surface facing the display panel and a second surface facing the window. The second surface may be flat.

In an embodiment, the first surface may be wrinkled.

In an embodiment, the window may include glass.

In an embodiment, the display panel may include a plastic substrate.

In an embodiment, the flexible display device may further include a polarizing layer between the display panel and the adhesive layer.

A method of providing a flexible display device includes wrinkling a bendable area of a display panel, providing an adhesive layer on the display panel, the adhesive layer including a wrinkled first surface facing the display panel and a flat second surface which is opposite to the first surface, and providing a window on the display panel with the adhesive layer therebetween.

In an embodiment, wrinkling the bendable area of the display panel may include providing a stage having a wrinkled upper surface, providing the display panel in which the bendable area is flat on the upper surface of the stage, and providing a pressure in a direction from the display panel to the stage to wrinkle the bendable area of the display panel.

In an embodiment, providing the adhesive layer may include applying a liquid adhesive on the display panel.

In an embodiment, providing the adhesive layer may include attaching a solid adhesive film on the display panel.

A method of providing a flexible display device includes wrinkling a bendable area of a window, providing an adhesive layer on the window, the adhesive layer including a wrinkled first surface facing the window and a flat second surface which is opposite to the first surface, providing a display panel on the window with the adhesive layer therebetween, and bending and then unbending the bendable area of the window together with the adhesive layer and the display panel.

In an embodiment, the first surface may be flat and the second surface may be wrinkled after bending and then unbending the bendable area of the window.

In the flexible display device, the thickness of the bendable portion of the adhesive layer between the display panel and the window may vary in a direction along the window so that the formation of wrinkles in the window may be reduced or effectively prevented. Accordingly, the recognition of wrinkles of the flexible display device from outside thereof may be reduced or effectively prevented.

BRIEF DESCRIPTION OF THE DRAWINGS

Embodiments will be more clearly understood from the following detailed description taken in conjunction with the accompanying drawings.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a flexible display device 10 is bent or unbent a plurality of times, wrinkles may occur in the flexible display device 10. Specifically, when wrinkles occur in a window 200 of the flexible display device 10, the wrinkles may be visually recognized from outside the flexible display device 10. Accordingly, display quality of the flexible display device 10 may be deteriorated.

Hereinafter, embodiments of flexible display devices and methods of providing flexible display devices will be explained in detail with reference to the accompanying drawings.

Figure 1:
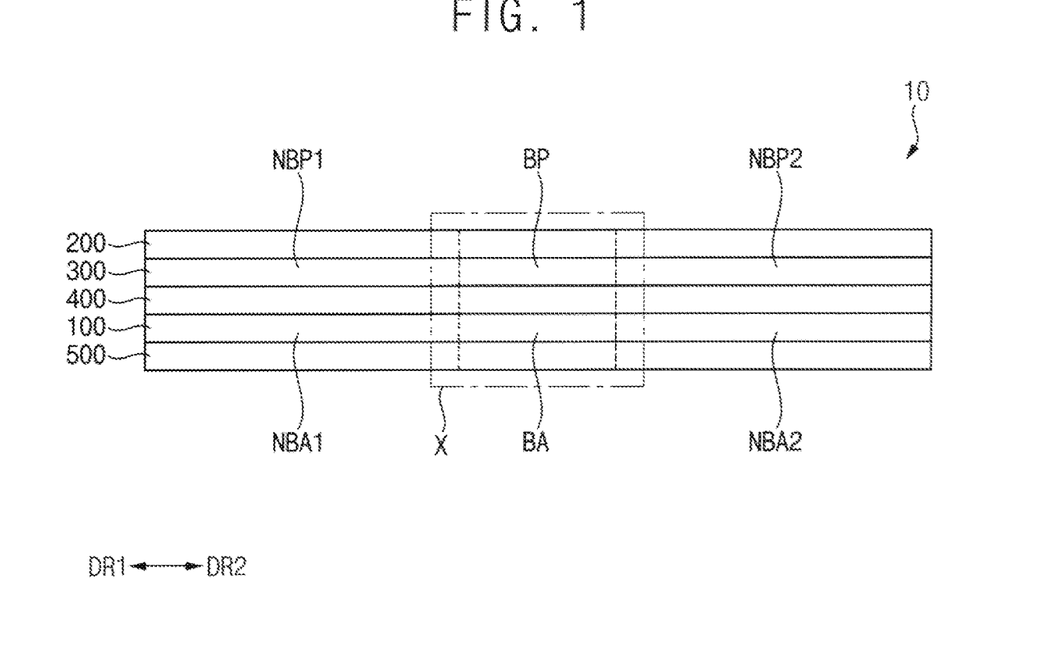
FIGS. 1 and 2 are cross-sectional views illustrating an embodiment of a flexible display device.
Figure 2:
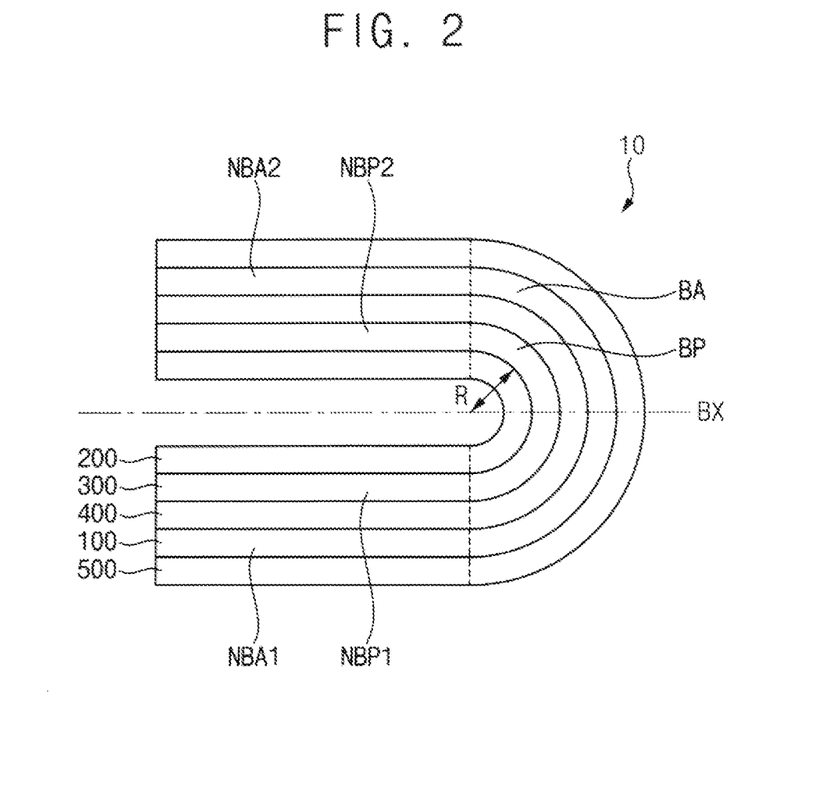

FIGS. 1 and 2 are cross-sectional views illustrating an embodiment of a flexible display device 10. FIG. 1 illustrates the flexible display device 10 which is flat or unbent, and FIG. 2 illustrates the flexible display device 10 which is bent.

Referring to FIGS. 1 and 2, the flexible display device 10 may include a display panel 100, a window 200, an adhesive layer 300, a polarizing layer 400 and a functional layer 500.

The display panel 100 may generate and/or display an image. The display panel 100 may include a plurality of pixels. Each of the pixels may generate and/or emit light for displaying the image.

The display panel 100 may include a bendable area BA and a non-bendable area provided in plural including non-bendable areas NBA1 and NBA2. The bendable area BA may be a planar area at which the display panel 100 is bendable, and the non-bendable areas NBA1 and NBA2 may be planar areas at which the display panel 100 is not bendable and/or which remains flat even when the display panel 100 is bent at the bendable area BA. Various components and layers of the flexible display device 10 may include a bendable area BA and a non-bendable area corresponding to those described above for the display panel 100.

The non-bendable areas NBA1 and NBA2 may include a first non-bendable area NBA1 and a second non-bendable area NBA2. The first non-bendable area NBA1 may be adjacent to the bendable area BA in a first direction DR1. The second non-bendable area NBA2 may be adjacent to the bendable area BA in a second direction DR2 opposite to the first direction DR1. In other words, the bendable area BA may be positioned between the first non-bendable area NBA1 and the second non-bendable area NBA2 along the first direction DR1 (or along the second direction DR2). The flexible display device 10 which is unbent may be disposed in a plane defined by the first direction DR1 (or the second direction DR2) and a third direction crossing each of the first direction DR1 and the second direction DR2 (e.g., into the view of FIG. 1).

The display panel 100 may include layers including or formed of a polymer material. Accordingly, the display panel 100 may have flexible characteristics. In an embodiment, the display panel 100 may include a plastic substrate.

The window 200 may be disposed on the display panel 100. The window 200 may transmit the image displayed from the display panel 100. The window 200 may protect the display panel 100 from the outside of the flexible display device 10. The window 200 may provide an outer surface (or front surface) of the flexible display device 10.

In an embodiment, the window 200 may include glass. The window 200 may include be formed of very thin glass, and accordingly, the window 200 may have flexible characteristics.

The adhesive layer 300 may be disposed between the display panel 100 and the window 200 along a thickness direction of the flexible display device 10. The adhesive layer 300 may bond the window 200 to the display panel 100.

The adhesive layer 300 may include a transparent adhesive material having a relatively high light transmittance. In an embodiment, the adhesive layer 300 may include an optically clear adhesive ("OCA"), an optically clear resin ("OCR"), a pressure sensitive adhesive ("PSA") or the like.

The adhesive layer 300 may include a bendable portion BP and non-bendable portions NBP1 and NBP2. The bendable portion BP may be a portion of the adhesive layer 300 which is bendable, and the non-bendable portions NBP1 and NBP2 may be portions of the adhesive layer 300 at which the adhesive layer 300 is not bendable and/or which remains flat even when the adhesive layer 300 is bent at the bendable portion BP.

The bendable portion BP may overlap or correspond to the bendable area BA of the display panel 100. The non-bendable portions NBP1 and NBP2 may respectively overlap or correspond to the non-bendable areas NBA1 and NBA2 of the display panel 100. The non-bendable portions NBP1 and NBP2 may include a first non-bendable portion NBP1 and a second non-bendable portion NBP2. The first non-bendable portion NBP1 may overlap or correspond to the first non-bendable area NBA1 of the display panel 100, and the second non-bendable portion NBP2 may overlap or correspond to the second non-bendable area NBA2 of the display panel 100. In other words, the bendable portion BP may be positioned between the first non-bendable portion NBP1 and the second non-bendable portion NBP2 in a direction along the display panel 100.

The polarizing layer 400 may be disposed between the display panel 100 and the adhesive layer 300 along a thickness direction of the flexible display device 10. The polarizing layer 400 may reduce reflection of external light incident on the display panel 100 through the window 200 and from outside the flexible display device 10. In an embodiment, for example, when external light passes through the polarizing layer 400 and is reflected from under the polarizing layer 400 (for example, at the display panel 100) and then passes through the polarizing layer 400 again, the polarizing layer 400 may change the phase of the external light. Accordingly, since the phase of the reflected light is different from the phase of the incident light entering the polarizing layer 400, extinction interference may occur, and reflection of external light may be reduced, thereby improving the visibility of the displayed image of the flexible display device 10.

The polarizing layer 400 may include a polymer material. Accordingly, the polarizing layer 400 may have flexible characteristics.

The functional layer 500 may be disposed under the display panel 100. The functional layer 500 faces the polarizing layer 400 with the display panel 100 therebetween. The functional layer 500 may include layers that provide various functions to the display panel 100. In an embodiment, the functional layer 500 may include at least one of a light blocking layer, a cushion layer and a heat dissipation layer. The light blocking layer may block light incident to the display panel 100. The cushion layer may absorb a physical impact applied to the display panel 100. The heat dissipation layer may emit heat generated from the display panel 100.

The functional layer 500 may include layers including or formed of a polymer material. Accordingly, the functional layer 500 may have flexible characteristics.

Within the flexible display device 10, the window 200, the adhesive layer 300, the polarizing layer 400, the display panel 100 and the functional layer 500 may be in order and may each have flexible characteristics. That is, one or more among the window 200, the adhesive layer 300, the polarizing layer 400, the display panel 100 and the functional layer 500 may be bendable together with another among the window 200, the adhesive layer 300, the polarizing layer 400, the display panel 100 and the functional layer 500.

The flexible display device 10 may be unbent as illustrated in FIG. 1 or may be bent as illustrated in FIG. 2. The flexible display device 10 may be bent with respect to a bending axis BX. In an embodiment, the flexible display device 10 may be bent such that portions of the window 200 may face each other. In an embodiment, for example, the flexible display device 10 may be bent such that a first portion of the window 200 corresponding to the first non-bendable area NBA1 of the display panel 100 and a second portion of the window 200 corresponding to the second non-bendable area NBA2 of the display panel 100 may face each other.

The flexible display device 10 may be bent to define a curvature of the flexible display device 10. The bendable area BA of the display panel 100 of the flexible display device 10 which is bent may have a radius of curvature R.

Figure 3:
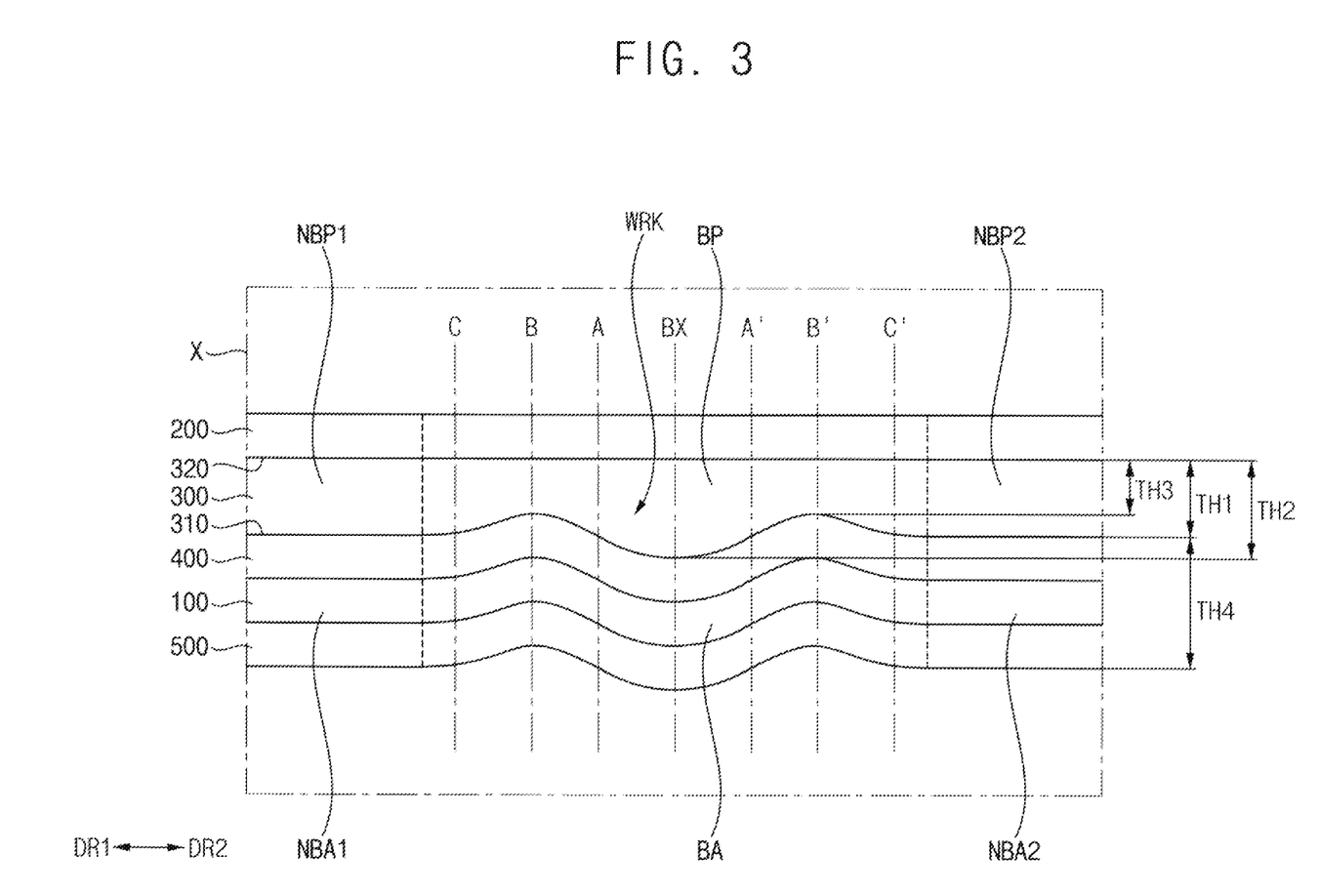
FIG. 3 is an enlarged cross-sectional view illustrating an embodiment of an area X in FIG. 1.

FIG. 3 is an enlarged cross-sectional view illustrating an area X in FIG. 1.

Referring to FIGS. 1 and 3, when the flexible display device 10 is bent and unbent multiple times, each of the display panel 100, the polarizing layer 400 and the functional layer 500 may be deformed as compared to being completely flat. In an embodiment, for example, when the flexible display device 10 is bent and unbent multiple times, the flexible display device 10 which is unbent may include each of the bendable area BA of the display panel 100, a portion of the polarizing layer 400 overlapping the bendable area BA and a portion of the functional layer 500 overlapping the bendable area BA may have a folded shape or uneven shape in the cross-sectional view. As described above, each of the display panel 100, the polarizing layer 400 and the functional layer 500 may include a polymer material. Since the polymer material has a molecular structure in the form of a chain, plastic deformation may occur in each of the display panel 100, the polarizing layer 400 and the functional layer 500 (e.g., at the bendable area BA) when the flexible display device 10 is bent and unbent multiple times.

As described above, the window 200 may include glass. Since the glass has a crystalline arrangement structure, plastic deformation may not occur in the window 200 or may be less than that of the display panel 100, the polarizing layer 400 and/or the functional layer 500 when the flexible display device 10 is bent and unbent multiple times. However, when the window 200 is bonded to the display panel 100, the polarizing layer 400 and the functional layer 500 such as by the adhesive layer 300, stress generated by the display panel 100, the polarizing layer 400 and the functional layer 500 which are deformed may be transmitted to the window 200 through the adhesive layer 300, and accordingly, the window 200 may be deformed by the stress.

In order to prevent deformation of the window 200 described above, a thickness of the bendable portion BP of the adhesive layer 300 may vary along the first direction DR1 and/or the second direction DR2. The thickness of the bendable portion BP of the adhesive layer 300 may vary along the first direction DR1 and/or the second direction DR2 based on the deformation of each of the display panel 100, the polarizing layer 400 and the functional layer 500, so that the deformation of the window 200 may be reduced or effectively prevented. That is, the thickness of the bendable portion BP which varies may dispose the window 200 flat or unbent even at the bendable area BA.

Thickness of the non-bendable portions NBP1 and NBP2 of the adhesive layer 300 may be constant along the first direction DR1 and/or the second direction DR2. Although the flexible display device 10 is bent and unbent multiple times, since the non-bendable areas NBA1 and NBA2 of the display panel 100, a portion of the polarizing layer 400 overlapping the non-bendable areas NBA1 and NBA2, and a portion of the functional layer 500 overlapping the non-bendable areas NBA1 and NBA2 are not deformed, the thickness of the non-bendable portions NBP1 and NBP2 of the adhesive layer 300 may be constant along the first direction DR1 and/or the second direction DR2. Accordingly, the non-bendable portions NBP1 and NBP2 may have a thickness TH1 which is constant. Referring to FIG. 3, the adhesive layer 300 at the first non-bendable portion NBP1 and the second non-bendable portion NBP2 may have the thickness TH1 along an entirety of the first non-bendable area NBA1 and the second non-bendable area NBA2 of the display panel 100.

The adhesive layer 300 may include points A and A' (e.g., first points) spaced apart from the bending axis BX by $\frac{1}{4}*\pi*R$ respectively in the first direction DR1 and the second direction DR2, points B and B' (e.g., second points) spaced apart from the bending axis BX by $\frac{2}{4}*\pi*R$ respectively in the first direction DR1 and the second direction DR2, and points C and C' (e.g., third points) spaced apart from the bending axis BX by $\frac{3}{4}*\pi*R$ respectively in the first direction DR1 and the second direction DR2. The points A, B and C and the points A', B' and C' may be in order from the bendable portion BP.

In embodiments, the bendable portion BP may have a maximum thickness TH2 extending along the display panel 100 between the bending axis BX and a respective point among the points A and A' spaced apart from the bending axis BX by $\frac{1}{4}*\pi*R$ respectively in the first direction DR1 and the second direction DR2. Here, R may be a radius of curvature (R in FIG. 2) of the bendable area BA of the display panel 100. In other words, the bendable portion BP of the adhesive layer 300 may have the maximum thickness TH2 between a point A (e.g., first point) spaced apart from the bending axis BX by $\frac{1}{4}*\pi*R$ in the first direction DR1 and a point A' (e.g., first point) spaced apart from the bending axis BX by $\frac{1}{4}*\pi*R$ in the second direction DR2 (e.g., from the point A to the point A').

In an embodiment, the bendable portion BP may have the maximum thickness TH2 which corresponds to the bending axis BX.

In an embodiment, the maximum thickness TH2 of the bendable portion BP may be greater than the thickness TH1 of the non-bendable portions NBP1 and NBP2.

In an embodiment, a value (e.g., difference) obtained by subtracting the thickness TH1 of the non-bendable portions NBP1 and NBP2 from the maximum thickness TH2 of the bendable portion BP may be about 5 micrometers (μm) to about 40 μm. The value obtained by subtracting the thickness TH1 of the non-bendable portions NBP1 and NBP2 from the maximum thickness TH2 of the bendable portion BP may be adjusted in proportion to a sum thickness TH4 of a thickness of the display panel 100, a thickness of polarizing layer 400 and a thickness of the functional layer 500 added together and maybe within the range of about 5 μm to about 40 μm. When the value obtained by subtracting the thickness TH1 of the non-bendable portions NBP1 and NBP2 from the maximum thickness TH2 of the bendable portion BP is less than about 5 μm, the adhesive layer 300 may not sufficiently compensate stress due to deformation of each of the display panel 100, the polarizing layer 400 and the functional layer 500. Further, when the value obtained by subtracting the thickness TH1 of the non-bendable portions NBP1 and NBP2 from the maximum thickness TH2 of the bendable portion BP is greater than about 40 μm, the radius of curvature of the display device 10 may increase as the adhesive layer 300 becomes thicker.

In embodiments, the bendable portion BP may have a minimum thickness TH3 between the points A and A' spaced apart from the bending axis BX by $\frac{1}{4}*\pi*R$ respectively in the first direction DR1 and the second direction DR2 and points C and C' spaced apart from the bending axis BX by $\frac{3}{4}*\pi*R$ respectively in the first direction DR1 or the second direction DR2, respectively. In other words, the bendable portion BP may have the minimum thickness TH3 between the point A spaced apart from the bending axis BX by $\frac{1}{4}*\pi*R$ in the first direction DR1 and a point C (e.g., third point) spaced apart from the bending axis BX by $\frac{3}{4}*\pi*R$ in the first direction DR1 or between the point A' spaced apart from the bending axis BX by $\frac{1}{4}*\pi*R$ in the second direction DR2 and a point C' (e.g., third point) spaced apart from the bending axis BX by $\frac{3}{4}*\pi*R$ in the second direction DR2.

In an embodiment, the bendable portion BP may have the minimum thickness TH3 at points B and B' spaced apart from the bending axis BX by $\frac{2}{4}*\pi*R$ respectively in the first direction DR1 and the second direction DR2. In other words, the bendable portion BP may have the minimum thickness TH3 at a point B (e.g., second point) spaced apart from the bending axis BX by $\frac{2}{4}*\pi*R$ in the first direction DR1 or a point B' (e.g., second point) spaced apart from the bending axis BX by $\frac{2}{4}*\pi*R$ in the second direction DR2.

In an embodiment, the minimum thickness TH3 of the bendable portion BP may be less than the thickness TH1 of the non-bendable portions NBP1 and NBP2.

In an embodiment, a value obtained by subtracting the minimum thickness TH3 of the bendable portion BP from the thickness TH1 of the non-bendable portions NBP1 and NBP2 may be about 5 μm to about 40 μm. The value obtained by subtracting the minimum thickness TH3 of the bendable portion BP from the thickness TH1 of the non-bendable portions NBP1 and NBP2 may be adjusted in proportion to the sum thickness TH4 of the thickness of the display panel 100, the thickness of the polarizing layer 400 and the thickness of the functional layer 500 within the range of about 5 μm to about 40 μm. When the value obtained by subtracting the minimum thickness TH3 of the bendable portion BP from the thickness TH1 of the non-bendable portions NBP1 and NBP2 is less than about 5 μm, the adhesive layer 300 may not sufficiently compensate stress due to deformation of each of the display panel 100, the polarizing layer 400 and the functional layer 500. Further, when the value obtained by subtracting the minimum thickness TH3 of the bendable portion BP from the thickness TH1 of the non-bendable portions NBP1 and NBP2 is greater than about 40 μm, the adhesive layer 300 may excessively compensate stress due to deformation of the display panel 100, the polarizing layer 400 and the functional layer 500.

The adhesive layer 300 may include a first surface 310 facing the display panel 100 and a second surface 320 facing the window 200. The first surface 310 may be opposite to the second surface 320. The first surface 310 of the adhesive layer 300 may be wrinkled (for example, a wrinkle WRK provided in plural including wrinkles WRK may be formed at the first surface 310 of the adhesive layer 300), and the second surface 320 of the adhesive layer 300 may remain flat. The display panel 100, the polarizing layer 400 and the functional layer 500 may include a recessed portion which is recessed away from the adhesive layer 300 and corresponds to the wrinkle WRK. Although the first surface 310 of the adhesive layer 300 is wrinkled, since the thickness of the bendable portion BP of the adhesive layer 300 varies along the first direction DR1 and/or the direction DR2 corresponding to the wrinkles WRK, the adhesive layer 300 may have the second surface 320 which is flat to define a flat surface. Accordingly, the window 200 which is closer to the second surface 320 than the first surface 310 may not be wrinkled, and the window 200 may maintain a flat shape.

Figure 4:
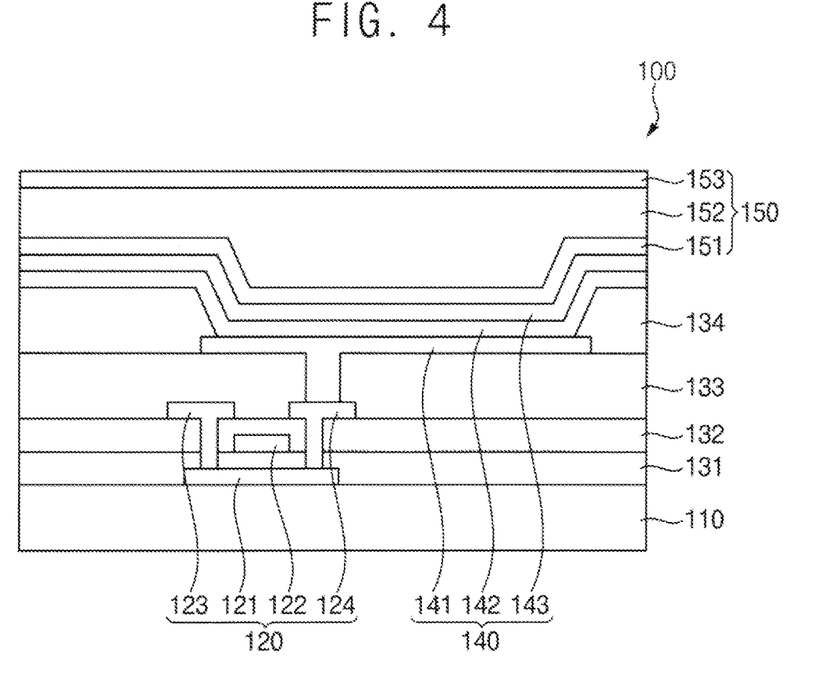
FIG. 4 is an enlarged cross-sectional view illustrating an embodiment of a display panel.

FIG. 4 is an enlarged cross-sectional view illustrating an embodiment of a display panel 100. FIG. 4 may illustrate one pixel of the display panel 100 in FIG. 1

Referring to FIG. 4, the display panel 100 may include a substrate 110, a transistor 120, a light emitting element 140 and a thin film encapsulation layer 150.

The substrate 110 may be a transparent or opaque insulating substrate. In an embodiment, the substrate 110 may include plastic such as polyimide, polycarbonate, polyethylene terephthalate, polyacrylate or the like.

An active pattern 121 of the transistor 120 may be disposed on the substrate 110. In an embodiment, the active pattern 121 may include amorphous silicon, polycrystalline silicon or the like. In an embodiment, the active pattern 121 may include an oxide semiconductor.

A gate insulating layer 131 may be disposed on the substrate 110, and may cover the active pattern 121. The gate insulating layer 131 may include an inorganic insulating material such as silicon oxide, silicon nitride, silicon oxynitride or the like.

A gate electrode 122 of the transistor 120 may be disposed on the gate insulating layer 131, and may overlap the active pattern 121. The gate electrode 122 may include a conductive material such as copper (Cu), molybdenum (Mo), titanium (Ti), aluminum (Al) or the like.

An insulating interlayer 132 may be disposed on the gate insulating layer 131, and may cover the gate electrode 122. The insulating interlayer 132 may include an inorganic insulating material such as silicon oxide, silicon nitride, silicon oxynitride or the like.

A source electrode 123 and a drain electrode 124 of the transistor 120 may be disposed on the insulating interlayer 132, and may be connected to the active pattern 121. The source electrode 123 and the drain electrode 124 may include a conductive material such as copper (Cu), molybdenum (Mo), titanium (Ti), aluminum (Al) or the like. The active pattern 121, the gate electrode 122, the source electrode 123 and the drain electrode 124 may together form the transistor 120.

A planarization layer 133 may be disposed on the insulating interlayer 132, and may cover the source electrode 123 and the drain electrode 124. The planarization layer 133 may include an inorganic insulating material such as silicon oxide, silicon nitride, silicon oxynitride, etc. and/or an organic insulating material such as acrylic resin, epoxy resin, phenol resin, polyamide resin, polyimide resin, unsaturated polyester resin, phenylene resin, polyphenylene sulfide resin, benzocyclobutene, etc.

A pixel electrode 141 of the light emitting element 140 may be disposed on the planarization layer 133, and may be connected to the drain electrode 124. The pixel electrode 141 may include a transparent conductive layer including indium-tin-oxide ("ITO"), indium-zinc-oxide ("IZO"), zinc oxide (ZnO), indium oxide ($In_2O_3$), etc. and a reflective conductive layer including silver (Ag), magnesium (Mg), aluminum (Al), platinum (Pt), lead (Pb), gold (Au), nickel (Ni), neodymium (Nd), iridium (Ir), chromium (Cr), lithium (Li), calcium (Ca), etc. In an embodiment, the pixel electrode 141 may have a stacked structure of ITO, Ag, and ITO. In such an embodiment, the pixel electrode 141 may be a reflective electrode.

A pixel defining layer 134 may be disposed on the planarization layer 133, and may cover at least a portion of the pixel electrode 141. In an embodiment, the pixel defining layer 134 may cover a peripheral portion or edge of the pixel electrode 141, and may define a pixel opening exposing a central portion of the pixel electrode 141 to outside the pixel defining layer 134. The pixel defining layer 134 may include an inorganic insulating material such as silicon oxide, silicon nitride, silicon oxynitride, etc. and/or an organic insulating material such as acrylic resin, epoxy resin, phenol resin, polyamide resin, polyimide resin, unsaturated polyester resin, phenylene resin, polyphenylene sulfide resin, benzocyclobutene, etc.

An emission layer 142 of the light emitting element 140 may be disposed on the pixel electrode 141 which is exposed by the pixel opening and on the pixel defining layer 134. Holes provided from the pixel electrode 141 and electrons provided from an opposite electrode 143 are combined in the emission layer 142 to form excitons, and the excitons change from an excited state to a ground state, so that the emission layer 142 may emit light.

The opposite electrode 143 may be disposed on the emission layer 142. The opposite electrode 143 may include a transparent conductive layer including lithium (Li), calcium (Ca), aluminum (Al), magnesium (Mg), silver (Ag), platinum (Pt), lead (Pb), nickel (Ni), gold (Au), Neodymium (Nd), iridium (Ir), chromium (Cr), barium (Ba) or the like. The opposite electrode 143 may be a transmissive electrode. The pixel electrode 141, the emission layer 142 and the opposite electrode 143 may together form the light emitting element 140.

The thin film encapsulation layer 150 may be disposed on the opposite electrode 143. The thin film encapsulation layer 150 may reduce or effectively prevent impurities and moisture from penetrating into the light emitting element 140 from outside the thin film encapsulation layer 150. The thin film encapsulation layer 150 may include at least one inorganic encapsulation layer and at least one organic encapsulation layer. In an embodiment, the thin film encapsulation layer 150 may include a first inorganic encapsulation layer 151, a second inorganic encapsulation layer 153 disposed on the first inorganic encapsulation layer 151, and an organic encapsulation layer 152 disposed between the first inorganic encapsulation layer 151 and the second inorganic encapsulation layer 153.

Figure 5:
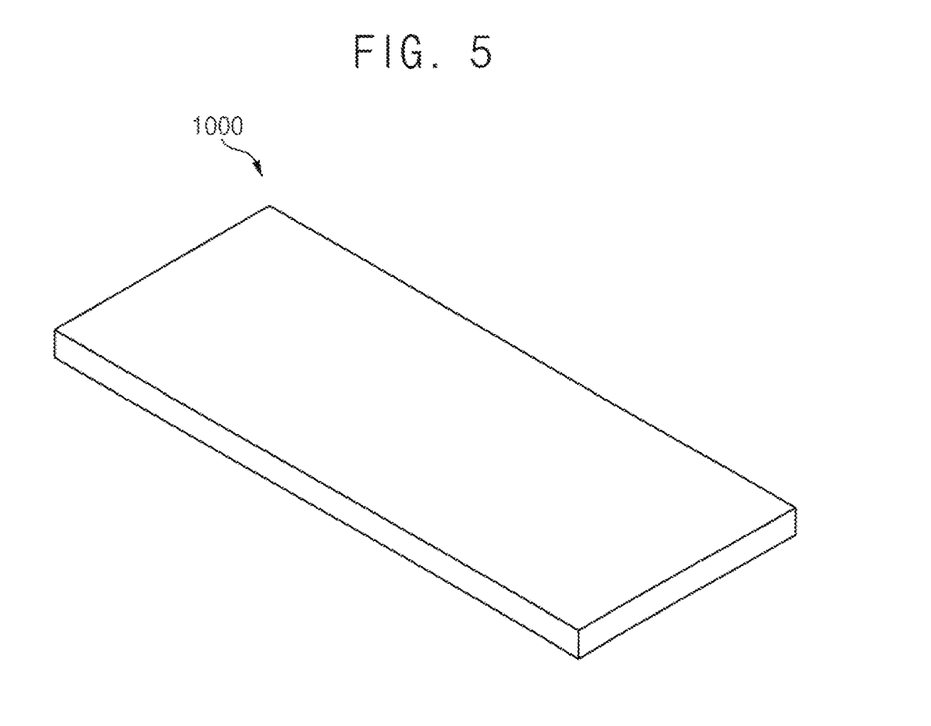
FIGS. 5 and 6 are perspective views illustrating an embodiment of a foldable display device.
Figure 6:
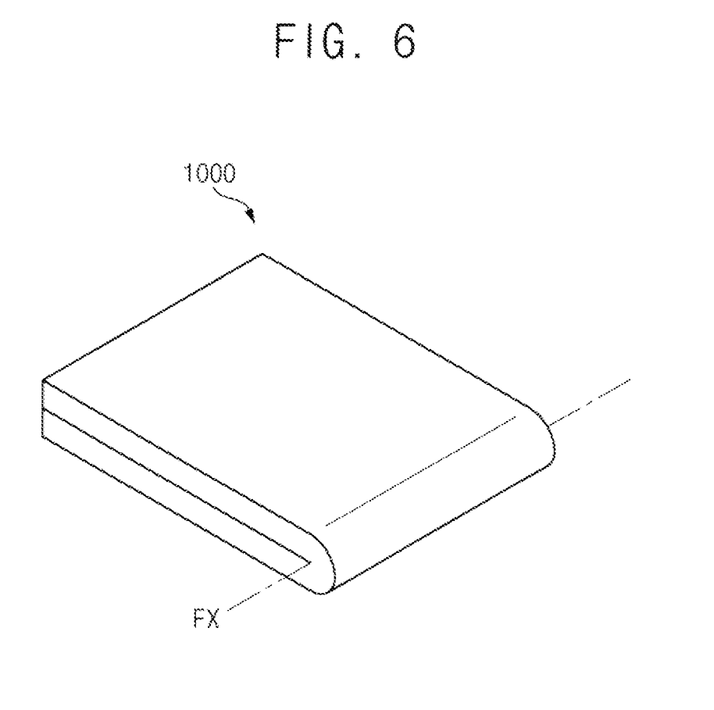

FIGS. 5 and 6 are perspective views illustrating a foldable display device 1000.

Referring to FIGS. 5 and 6, the foldable display device 1000 may be foldable and/or unfoldable about a folding axis FX. The flexible display device 10 illustrated in FIGS. 1 and 2 may be applied to the foldable display device 1000 illustrated in FIGS. 5 and 6. In this case, the bending axis BX of the flexible display device 10 may correspond to the folding axis FX of the foldable display device 1000. However, the invention is not limited thereto, and the flexible display device 10 illustrated in FIGS. 1 and 2 may also be applied to a rollable display device or a slidable display device.

FIGS. 7, 8, 9 and 10 are cross-sectional views illustrating an embodiment of a method of providing a flexible display device 10.

Figure 7:
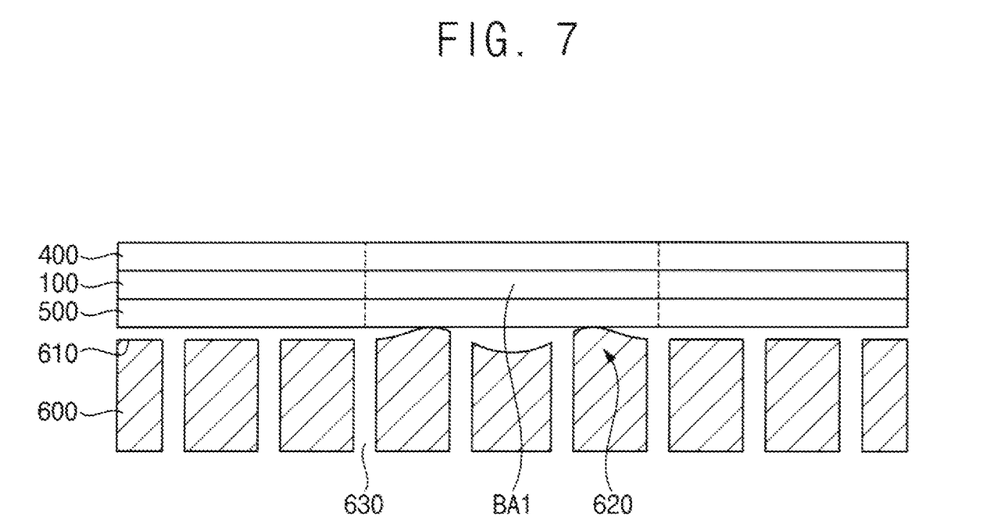
FIGS. 7, 8, 9 and 10 are cross-sectional views illustrating an embodiment of a method of providing a flexible display device.
Figure 8:
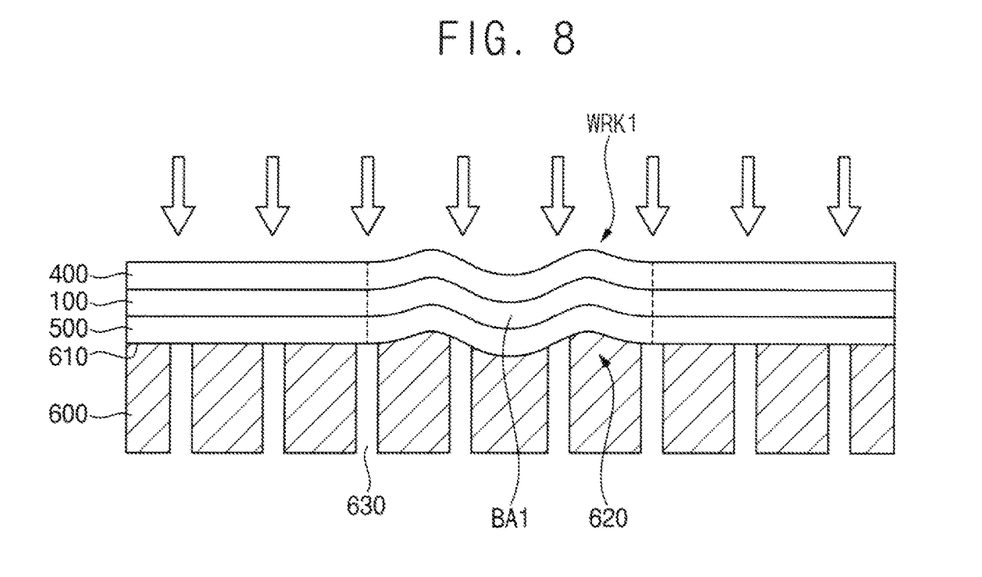

Referring to FIGS. 7 and 8, a first bendable area BA1 of the display panel 100 may be pre-wrinkled (FIG. 8) from an original flat shape (FIG. 7). A first wrinkle WRK1 may be provided in plural including first wrinkles WRK1 in the first bendable area BA1 of the display panel 100.

As illustrated in FIG. 7, a stage 600 may be provided. An upper surface 610 of the stage 600 may be wrinkled at a region corresponding to the first bendable area BA1 of the display panel 100. In other words, curved surface which define stage wrinkles 620 may be provided or formed at the upper surface 610 of the stage 600. The stage 600 may include a suction whole 630 provided in plural including a plurality of suction holes 630. Each of the suction holes 630 may pass completely through a thickness of the stage 600. Each of the suction holes 630 may extend from a lower surface of the stage 600 to the upper surface 610 of the stage 600 which is opposite to the lower surface thereof.

Referring to FIG. 7, a preliminary form of the display panel 100 in which the first bendable area BA1 is originally flat may be disposed on the upper surface 610 of the stage 600. The polarizing layer 400 may be attached above the display panel 100, and the functional layer 500 may be attached under the display panel 100. A portion of the polarizing layer 400 overlapping the first bendable area BA1 and a portion of the functional layer 500 overlapping the first bendable area BA1 may be originally flat.

As illustrated in FIG. 8, a pressure may be applied in a direction from the display panel 100 to the stage 600 (indicated by downward arrows in FIG. 8) to wrinkle the first bendable area BA1 of the display panel 100 and corresponding areas of the polarizing layer 400 and the functional layer 500. Therefore, the first wrinkles WRK1 may be provided or formed in the first bendable area BA1 of the display panel 100. The first wrinkles WRK1 provided or formed in the first bendable area BA1 of the display panel 100 may correspond to the stage wrinkles 620 defined at the upper surface 610 of the stage 600. Wrinkles corresponding to the stage wrinkles 620 defined at the upper surface 610 of the stage 600 may be provided or formed on each of the corresponding bendable portion of the polarizing layer 400 overlapping the first bendable area BA1 and the corresponding bendable portion of the functional layer 500 overlapping the first bendable area BA1.

Referring to FIGS. 7 and 8, the method may include providing a preliminary display panel wrinkled at a bendable area BA thereof to provide a wrinkled display panel including a wrinkled bendable area having a wrinkled shape. The method may further include providing a stage 600 having an upper surface 610 which is wrinkled and has a shape corresponding to the wrinkled shape of the wrinkled bendable area of the wrinkled display panel, providing the preliminary display panel including the bendable area BA which is flat, on the upper surface 610 of the stage 600 which is wrinkled, and providing a pressure in a direction from the preliminary display panel to the stage 600 to wrinkle the bendable area BA of the preliminary display panel.

In an embodiment, the pressure may be applied to each of the functional layer 500, the display panel 100 and the polarizing layer 400 through the suction holes 630 to deform each of the functional layer 500, the display panel 100 and the polarizing layer 400. The functional layer 500, the display panel 100 and the polarizing layer 400 may be deformed together by the pressure applied via the suction holes 630 (e.g., at a same time) without being limited thereto. Referring to FIG. 8, each of the functional layer 500, the display panel 100 and the polarizing layer 400 may be deformed along the profile of the upper surface 610 of the stage 600 on which the stage wrinkles 620 are provided or formed. That is, the first wrinkles WRK1 of the functional layer 500, the display panel 100 and the polarizing layer 400 may have a shape which corresponds to a shape of the stage wrinkles 620.

Figure 9:
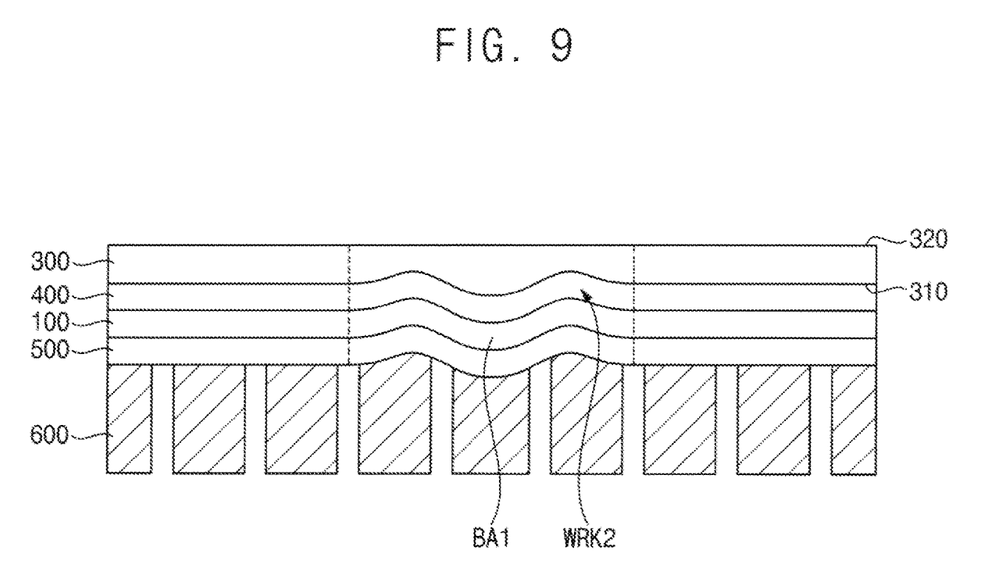

Referring to FIG. 9, the adhesive layer 300 may be provided or formed on the display panel 100. The adhesive layer 300 may include a first surface 310 which is wrinkled and facing the display panel 100 and a second surface 320 which is flat and opposite to the first surface 310. That is, the display panel 100 which is wrinkles as including the first wrinkles WRK1 disposes the first surface 310 of the adhesive layer 300 as a wrinkled surface and the second surface 320 as a flat surface. Second wrinkles WRK2 of the adhesive layer 300 may be provided or formed at the first surface 310. A shape or profile of the second wrinkles WRK2 of the adhesive layer 300 may correspond to the shape or profile of the first wrinkles WRK1 of the functional layer 500, the display panel 100 and the polarizing layer 400. The adhesive layer 300 may have a flat interface with the window 200 and a wrinkled interface with a stacked structure including the display panel 100. Referring to FIG. 9, the method may further include providing an adhesive layer 300 on the wrinkled display panel, the adhesive layer 300 including a bendable portion BP corresponding to the wrinkled bendable area of the wrinkled display panel, the bendable portion BP including a first surface 310 which faces the wrinkled display panel and has a wrinkled shape corresponding to the wrinkled shape of the wrinkled bendable area of the wrinkled display panel, and a second surface 320 which is opposite to the first surface 310 and is flat.

In an embodiment, the adhesive layer 300 may be provided or formed by applying a liquid adhesive on the display panel 100. The adhesive may have a surface tension. That is, the providing of the adhesive layer 300 may include providing a liquid adhesive on the wrinkled display panel. Accordingly, although the adhesive is applied on an upper surface of the polarizing layer 400 at which wrinkles are provided or formed, the adhesive layer 300 including the second surface 320 which is flat may be provided or formed such as owing to the surface tension of the adhesive layer material.

In another embodiment, the adhesive layer 300 may be formed by attaching a solid adhesive film on the display panel 100. That is, the providing of the adhesive layer 300 may include providing a solid adhesive film attached to the wrinkled display panel. Before being attached to the display panel 100, the adhesive film may be formed to include a wrinkled surface on which wrinkles corresponding to the first wrinkles WRK1 formed on the display panel 100 are formed and the other flat surface. Accordingly, the adhesive layer 300 including the second surface 320 which is flat may be formed on the wrinkled upper surface of the polarizing layer 400.

Figure 10:
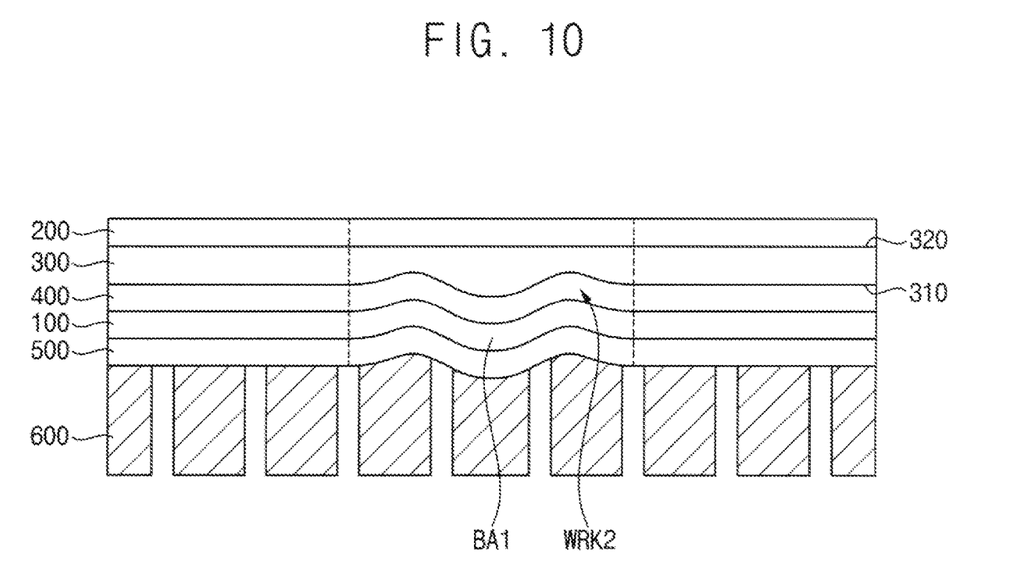

Referring to FIG. 10, the window 200 may be provided or formed facing the display panel 100 with the adhesive layer 300 interposed therebetween. The window 200 may be provided or formed on the second surface 320 of the adhesive layer 300 which is flat, and accordingly, the window 200 may have a flat shape even at the first bendable area BA1.

Referring to FIG. 10, the method may further include providing a window 200 facing the wrinkled display panel with the adhesive layer 300 therebetween, the window 200 having a flat shape corresponding to the second surface 320 of the adhesive layer 300 which is flat.

Referring again to FIG. 3, the flexible display device 10 which is flat includes the display panel 100 having the first wrinkles WRK1 at the bendable area BA and the adhesive layer 300 having the second wrinkles WRK2 corresponding to the first wrinkles WRK1.

FIGS. 11, 12, 13, 14 and 15 are cross-sectional views illustrating an embodiment of a method of providing a flexible display device 10. Descriptions on elements of a method of providing a flexible display device 10 with reference to FIGS. 11 to 15, which are substantially the same as or similar to those of the method of providing the flexible display device 10 with reference to FIGS. 7 to 10, will not be repeated.

Figure 11:
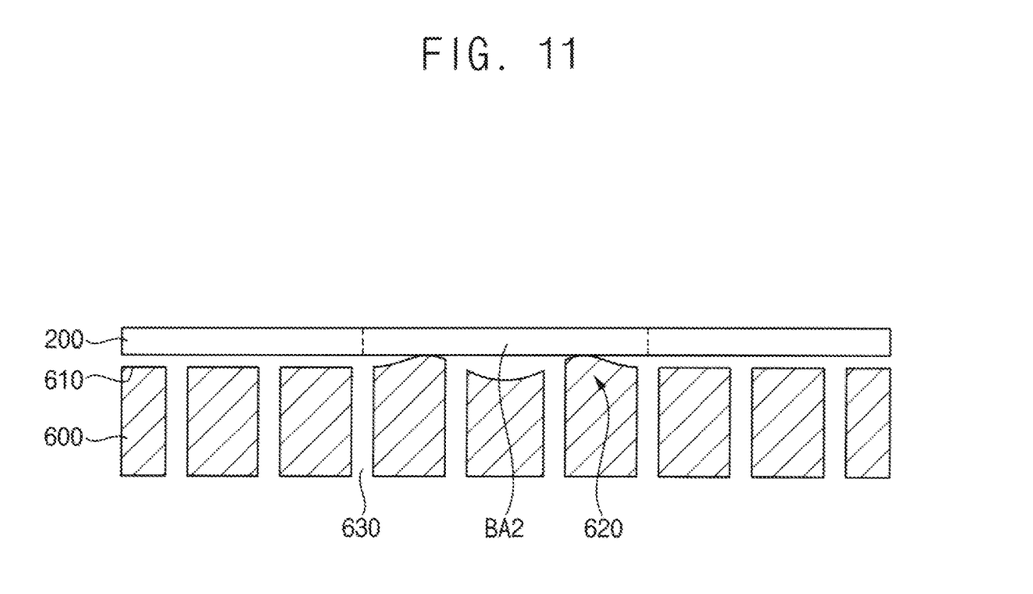
FIGS. 11, 12, 13, 14 and 15 are cross-sectional views illustrating an embodiment of a method of providing a flexible display device.
Figure 12:
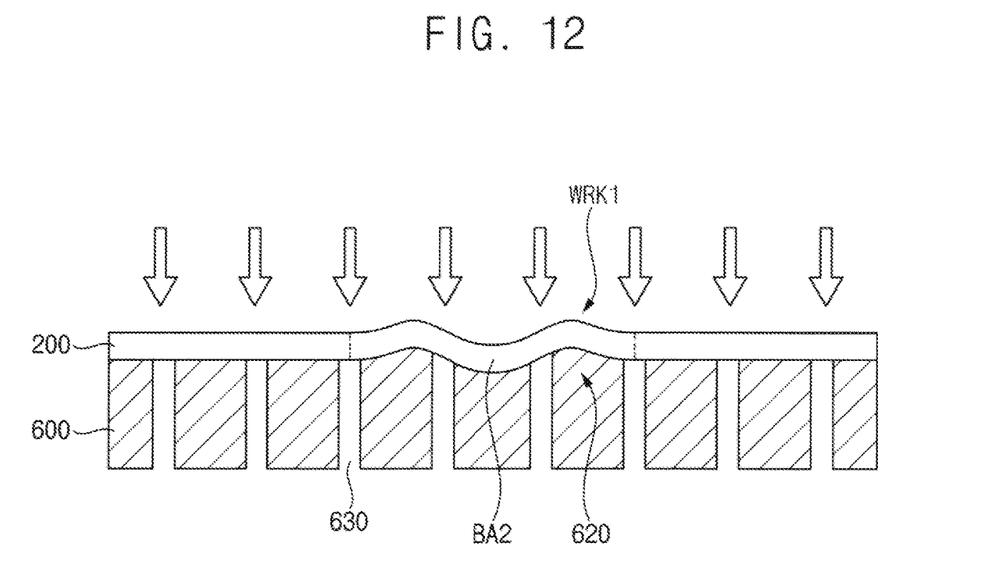

Referring to FIGS. 11 and 12, a second bendable area BA2 of the window 200 may be pre-wrinkled (FIG. 12) from an original flat shape (FIG. 11). First wrinkles WRK1 may be provided or formed in the second bendable area BA2 of the window 200.

As illustrated in FIG. 11, a preliminary form of the window 200 in which the second bendable area BA2 is originally flat may be disposed on the upper surface 610 of the stage 600.

As illustrated in FIG. 12, a pressure may be applied in a direction from the window 200 to the stage 600 (indicated by downward arrows in FIG. 12) to wrinkle the second bendable area BA2 of the window 200. Therefore, the first wrinkles WRK1 may be provided or formed in the second bendable area BA2 of the window 200. The first wrinkles WRK1 provided or formed in the second bendable area BA2 of the window 200 may correspond to the stage wrinkles 620 defined at the upper surface 610 of the stage 600. Referring to FIG. 12, the method may include providing a preliminary window wrinkled at a bendable area BA thereof to provide a wrinkled window including a wrinkled bendable area having a wrinkled shape.

Figure 13:
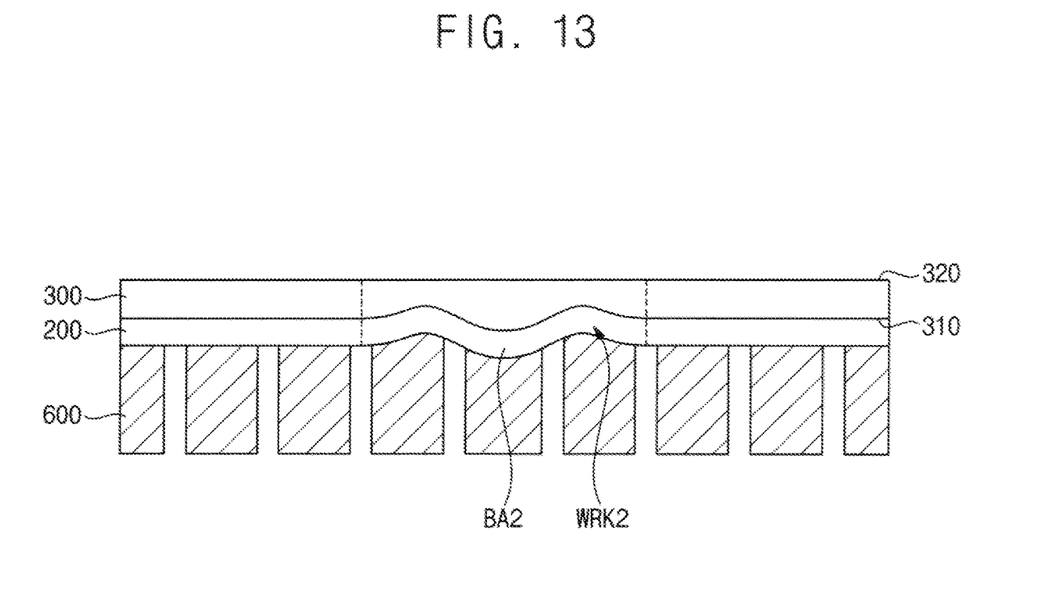

Referring to FIG. 13, the adhesive layer 300 may be provided or formed on the window 200 having the first wrinkles WRK1. The adhesive layer 300 may include the first surface 310 which is wrinkled facing the window 200 and the second surface 320 which is flat and opposite to the first surface 310. Second wrinkles WRK2 may be provided or formed at the first surface 310. The first surface 310 may define a wrinkled surface of the adhesive layer 300. A shape or profile of the second wrinkles WRK2 of the adhesive layer 300 may correspond to the shape or profile of the first wrinkles WRK1 of the window 200. Referring to FIG. 13, the method may further include providing an adhesive layer 300 on the wrinkled window, the adhesive layer 300 including a bendable portion BP corresponding to the wrinkled bendable area of the wrinkled window, the bendable portion BP including a preliminary first surface which faces the wrinkled window and has a wrinkled shape corresponding to the wrinkled shape of the wrinkled bendable area of the wrinkled window, and a preliminary second surface which is opposite to the preliminary first surface and is flat.

Figure 14:
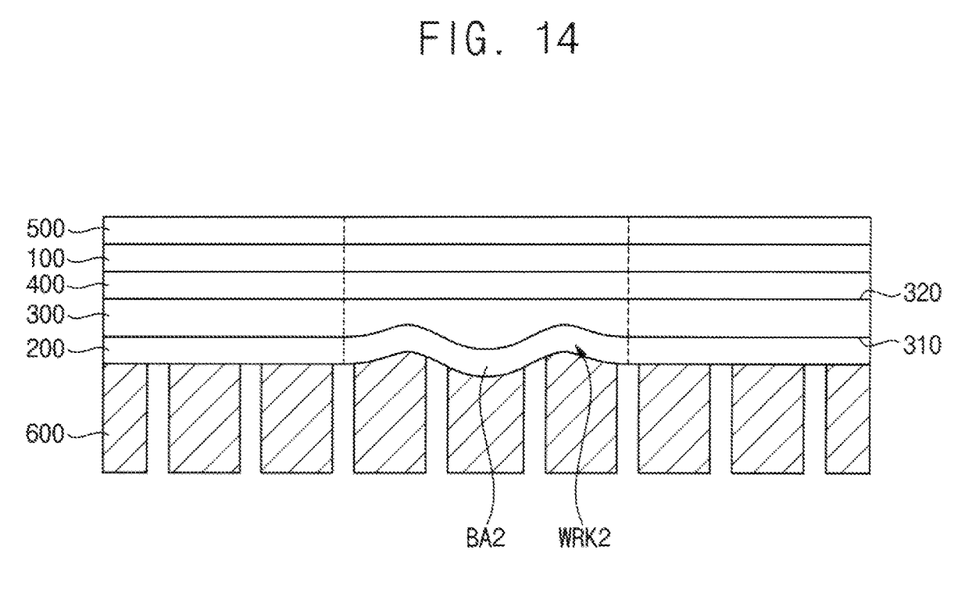

Referring to FIG. 14, the display panel 100 may be provided or formed on the window 200 with the adhesive layer 300 interposed therebetween. The display panel 100 may be provided or formed on the second surface 320 which is flat of the adhesive layer 300, and accordingly, the display panel 100 may have a flat shape. The polarizing layer 400 may be provided or formed between the display panel 100 and the adhesive layer 300, and the functional layer 500 may be provided or formed on the display panel 100. Each of the polarizing layer 400 provided between the second surface 320 of the adhesive layer 300 which is flat and the display panel 100 which is flat and the functional layer 500 provided or formed on the display panel 100 which is flat may also have a flat shape. Referring to FIG. 14, the method may further include providing a display panel 100 facing the wrinkled window with the adhesive layer 300 having the preliminary first surface, therebetween.

Figure 15:
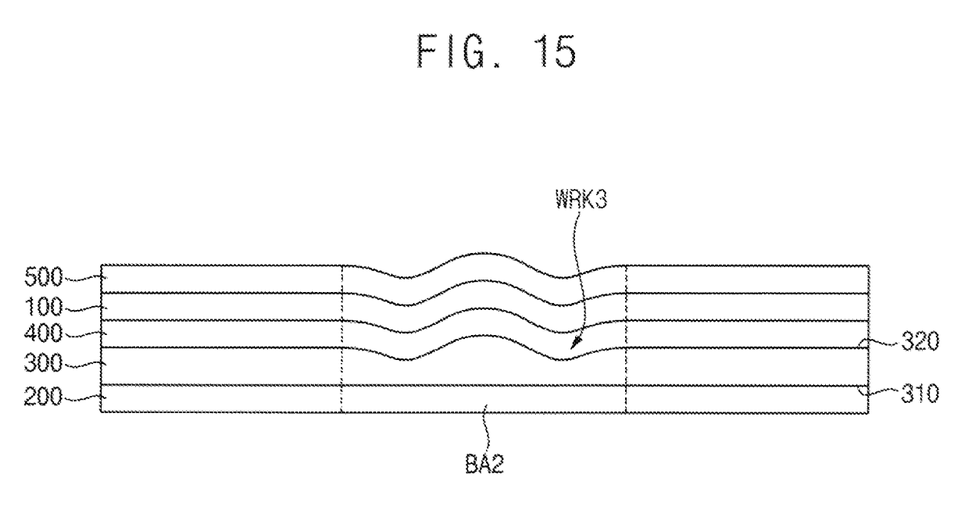

Referring to FIG. 15, the second bendable area BA2 of the window 200 having the layered structure including the adhesive layer 300, the polarizing layer 400, the display panel 100 and the functional layer 500 thereon may be bent and then unbent. In this case, each of a portion of the display panel 100 overlapping the second bendable area BA2, a portion of the adhesive layer 300 overlapping the second bendable area BA2, and a portion of the polarizing layer 400 overlapping the second bendable area BA2, and a portion of the functional layer 500 overlapping the second bendable area BA2 may be bent and then unbent together with the window 200 at the second bendable area BA2 of the window 200. Referring to FIG. 15, the method may further include providing each of the wrinkled window, the display panel 100 which faces the wrinkled window, and the adhesive layer 300 therebetween bent and unbent together with each other. The providing each of the wrinkled window, the display panel 100 which faces the wrinkled window, and the adhesive layer 300 therebetween bent and unbent together with each other includes flattening the preliminary first surface and wrinkling the preliminary second surface to have the wrinkled shape corresponding to the wrinkled shape of the wrinkled bendable area of the wrinkled window.

When each of the portion of the display panel 100 overlapping the second bendable area BA2, the portion of the polarizing layer 400 overlapping the second bendable area BA2 and the portion of the functional layer 500 overlapping the second bendable area BA2 is bent and then unbent, plastic deformation may occur in each of the display panel 100, the polarizing layer 400 and the functional layer 500. Accordingly, the portion of the display panel 100 overlapping the second bendable area BA2, the portion of the polarizing layer 400 overlapping the second bendable area BA2, and the portion of the functional layer 500 overlapping the second bendable area BA2 may be pre-wrinkled. In this case, a third wrinkle WRK3 provided in plural including third wrinkles WRK3 may be provided or formed at the second surface 320 of the adhesive layer 300, and the first surface 310 of the adhesive layer 300 may remain flat. That is, the second surface 320 which is closest to the display panel 100 may define the wrinkled surface of the adhesive layer 300. Further, the window 200 may be deformed according to the deformation of the first surface 310 of the adhesive layer 300, and accordingly, the window 200 may have a flat shape without wrinkles. That is, bending and unbending of the adhesive layer 300 which is pre-wrinkled, includes wrinkling of the functional layer 500, the display panel 100 and the polarizing layer 400, wrinkling of the second surface 320 of the adhesive layer 300, and flattening of the first surface 310 of the adhesive layer 300 together with the window 200.

One or more embodiment of the flexible display device 10 may be applied to a display device included in a computer, a notebook, a mobile phone, a smartphone, a smart pad, a personal media player ("PMP"), a personal digital assistant ("PDA"), an MP3 player or the like.

Although embodiments of flexible display devices and methods of providing flexible display devices have been described with reference to the drawings, the illustrated embodiments are examples, and may be modified and changed by a person having ordinary knowledge in the relevant technical field without departing from the technical spirit described in the following claims.

What is claimed is:
1. A flexible display device, comprising:
a display panel including a bendable area at which the display panel is bendable and a non-bendable area which is adjacent to the bendable area in a direction along the display panel;
a window facing the display panel and bendable together with the display panel; and
an adhesive layer which is between the display panel and the window and bendable together with the display panel, the adhesive layer including:
a bendable portion corresponding to the bendable area and having a thickness which varies along the direction to define a wrinkled shape of the bendable portion, and
a non-bendable portion corresponding to the non-bendable area and having a thickness which is constant along the direction,
a first surface which faces the display panel, and
a second surface which is opposite to the first surface and faces the window,
wherein the second surface of the adhesive layer which faces the window is flat at the bendable portion.

2. The flexible display device of claim 1, wherein
the bendable area of the display panel includes a bending axis about which the display panel is bendable,
the display panel which is bent about the bending axis includes a radius of curvature at the bendable area, and
the bendable portion of the adhesive layer includes:
a point spaced apart from the bending axis by $\frac{1}{4}*\pi*R$ in the direction, and
a maximum thickness defined between the bending axis and the point spaced apart from the bending axis by $\frac{1}{4}*\pi*R$ in the direction,
where the R is the radius of curvature of the bendable area of the display panel.

3. The flexible display device of claim 2, wherein within the adhesive layer, the maximum thickness of the bendable portion is greater than the thickness of the non-bendable portion.

4. The flexible display device of claim 3, wherein a difference between the thickness of the non-bendable portion of the adhesive layer and the maximum thickness of the bendable portion of the adhesive layer is about 5 micrometers to about 40 micrometers.

5. The flexible display device of claim 2, wherein within the adhesive layer, the maximum thickness of the bendable portion corresponds to the bending axis of the display panel.

6. The flexible display device of claim 1, wherein
the bendable area of the display panel includes a bending axis about which the display panel is bendable,
the display panel which is bent about the bending axis includes a radius of curvature at the bendable area, and
the bendable portion of the adhesive layer includes:
a first point spaced apart from the bending axis by $\frac{1}{4}*\pi*R$ in the direction,
a second point spaced apart from the bending axis by $\frac{3}{4}*\pi*R$ in the direction, and
a minimum thickness defined between the first point spaced apart from the bending axis by $\frac{1}{4}*\pi*R$ in the direction and the second point spaced apart from the bending axis by $\frac{3}{4}*\pi*R$ in the direction,
where the R is the radius of curvature of the bendable area of the display panel.

7. The flexible display device of claim 6, wherein within the adhesive layer, the minimum thickness of the bendable portion is less than the thickness of the non-bendable portion.

8. The flexible display device of claim 7, wherein a difference between the minimum thickness of the bendable portion and the thickness of the non-bendable portion is about 5 micrometers to about 40 micrometers.

9. The flexible display device of claim 6, wherein within the adhesive layer:
the bendable portion further includes a third point spaced apart from the bending axis by $\frac{2}{4}*\pi*R$ in the direction, and
the minimum thickness corresponds to the third point spaced apart from the bending axis by $\frac{2}{4}*\pi*R$ in the direction.

10. The flexible display device of claim 1, wherein the second surface of the adhesive layer which faces the window is flat at the non-bendable portion of the adhesive layer.

11. The flexible display device of claim 10, wherein within the adhesive layer:
the first surface is wrinkled to define the wrinkled shape of the bendable portion, and
at the bendable portion, the second surface which is flat and the first surface which is wrinkled together define the thickness of the bendable portion of the adhesive layer which varies along the direction.

12. The flexible display device of claim 1, wherein
the window includes glass and is bendable together with the display panel, and
the window includes a bendable portion corresponding the bendable portion of the adhesive layer having the thickness which varies along the direction,
wherein the bendable portion of the window is flat.

13. The flexible display device of claim 1, wherein the display panel includes a plastic substrate.

14. The flexible display device of claim 1, further comprising a polarizing layer between the display panel and the adhesive layer.

15. A method of providing a flexible display device, the method comprising:
provic ing a preliminary display panel wrinkled at a bendable area thereof to provide a wrinkled display panel including a wrinkled bendable area having a wrinkled shape;
providing an adhesive layer on the wrinkled display panel, the adhesive layer including a bendable portion corresponding to the wrinkled bendable area of the display panel, the bendable portion including:
  a first surface which faces the wrinkled display panel and has a wrinkled shape corresponding to the wrinkled shape of the wrinkled bendable area of the wrinkled display panel, and
  a second surface which is opposite to the first surface and is flat; and
providing a window facing the wrinkled display panel with the adhesive layer therebetween, the window having a flat shape corresponding to the second surface of the adhesive layer which is flat.

16. The method of claim 15, wherein the providing of the preliminary display panel wrinkled at the bendable area thereof includes:
providing a stage having an upper surface which is wrinkled and has a shape corresponding to the wrinkled shape of the wrinkled bendable area of the wrinkled display panel;
providing the preliminary display panel including the bendable area which is flat, on the upper surface of the stage which is wrinkled; and
providing a pressure in a direction from the preliminary display panel to the stage to wrinkle the bendable area of the preliminary display panel.

17. The method of claim 15, wherein the providing of the adhesive layer includes providing a liquid adhesive on the wrinkled display panel.

18. The method of claim 15, wherein the providing of the adhesive layer includes providing a solid adhesive film attached to the wrinkled display panel.

19. A method of providing a flexible display device, the method comprising:
providing a preliminary window wrinkled at a bendable area thereof to provide a wrinkled window including a wrinkled bendable area having a wrinkled shape;
providing an adhesive layer on the wrinkled window, the adhesive layer including a bendable portion corresponding to the wrinkled bendable area of the wrinkled window, the bendable portion including:
  a preliminary first surface which faces the wrinkled window and has a wrinkled shape corresponding to the wrinkled shape of the wrinkled bendable area of the wrinkled window, and
  a preliminary second surface which is opposite to the preliminary first surface and is flat;
providing a display panel facing the wrinkled window with the adhesive layer having the preliminary first surface therebetween; and
providing each of the wrinkled window, the display panel which faces the wrinkled window, and the adhesive layer therebetween bent and unbent together with each other.

20. The method of claim 19, wherein the providing each of the wrinkled window, the display panel which faces the wrinkled window, and the adhesive layer therebetween bent and unbent together with each other includes flattening the preliminary first surface and wrinkling the preliminary second surface to have the wrinkled shape corresponding to the wrinkled shape of the wrinkled bendable area of the wrinkled window.

* * * * *